F. H. HOPKINS.
THERMOSTATIC ARCH FLOW REGULATOR.
APPLICATION FILED NOV. 28, 1914.
1,172,709. Patented Feb. 22, 1916.
2 SHEETS—SHEET 1.
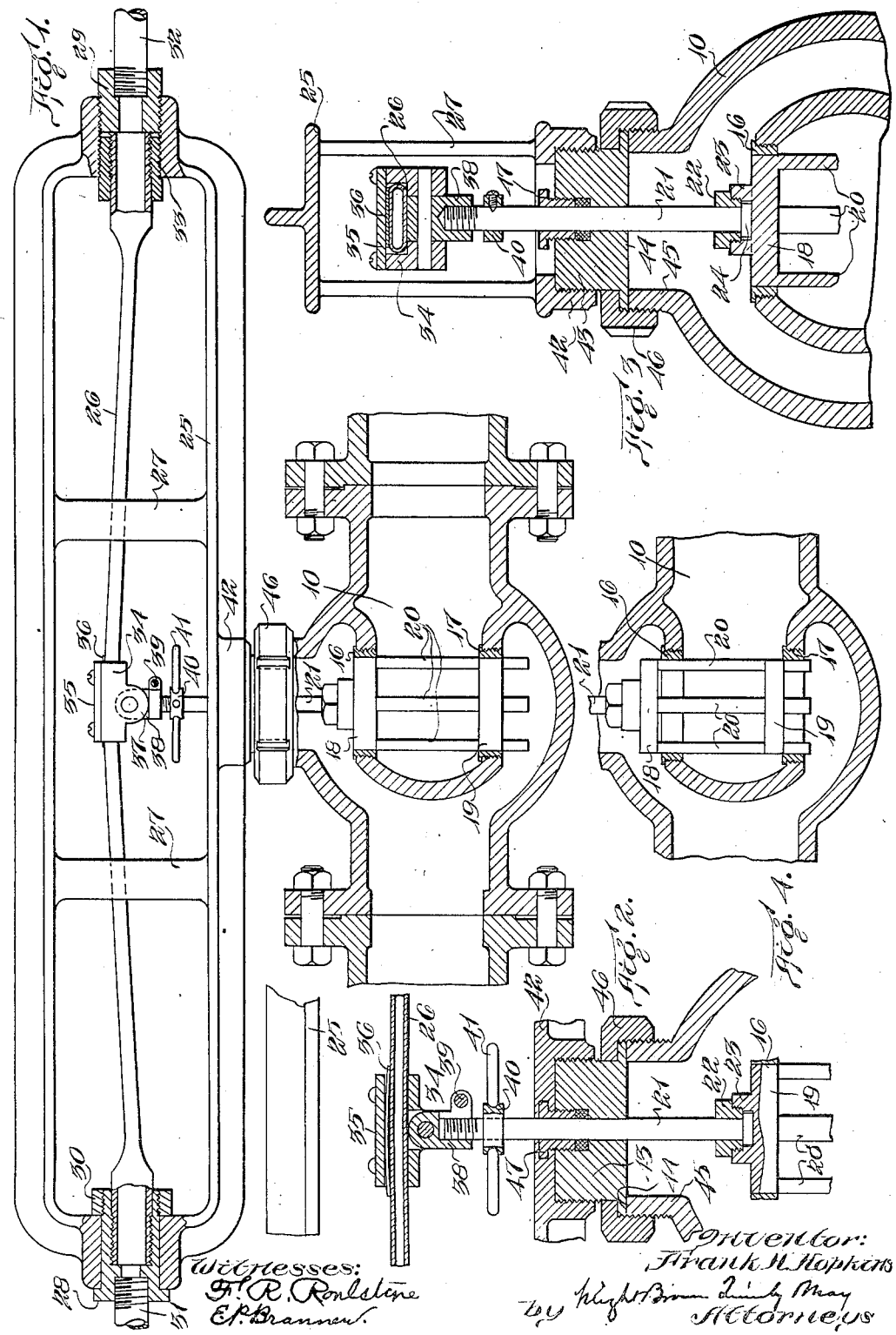

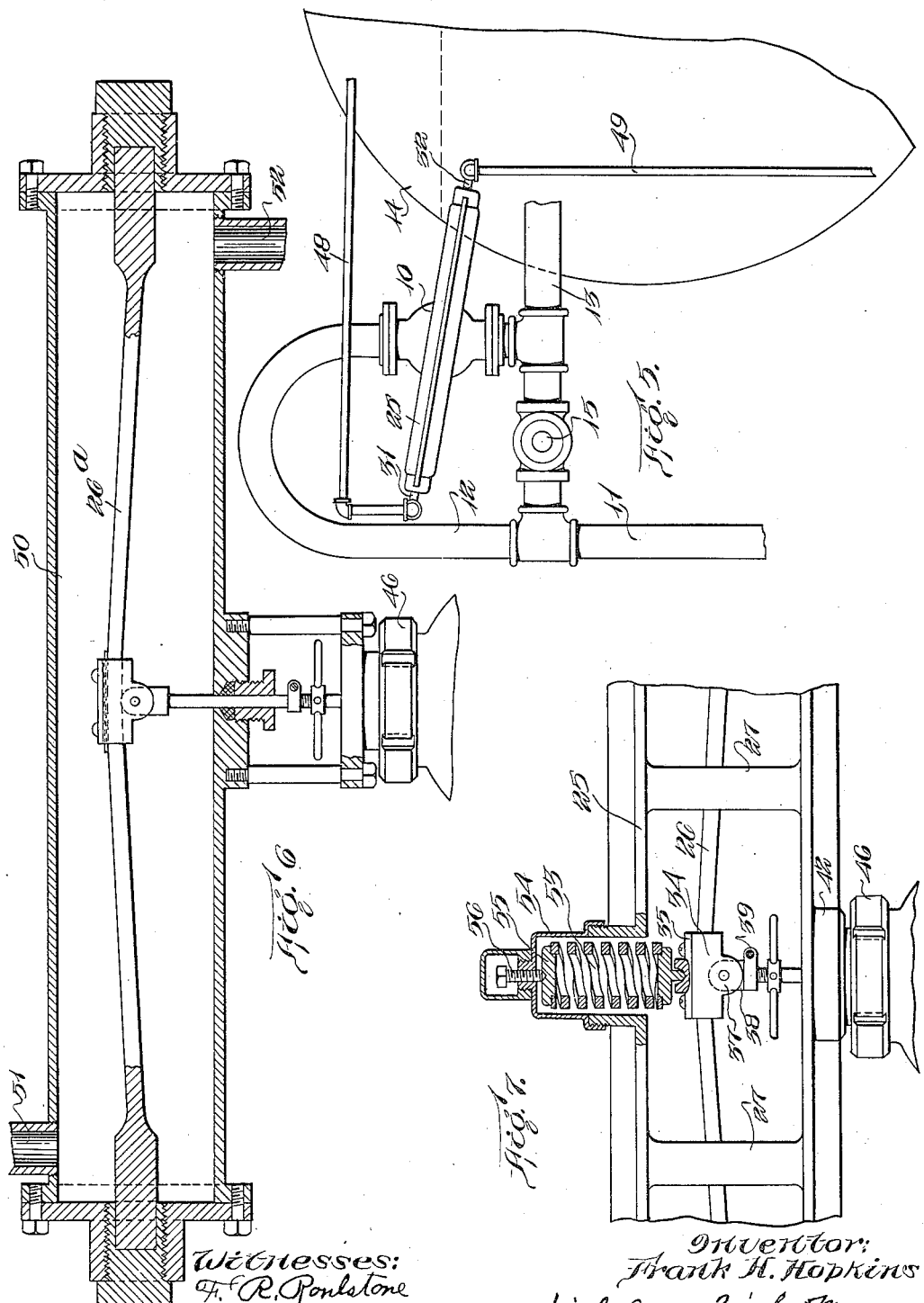

UNITED STATES PATENT OFFICE.

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

THERMOSTATIC ARCH FLOW-REGULATOR.

1,172,709. Specification of Letters Patent. Patented Feb. 22, 1916.

Application filed November 28, 1914. Serial No. 874,549.

*To all whom it may concern:*

Be it known that I, FRANK H. HOPKINS, a citizen of the United States, and resident of Somerville, in the county of Middlesex and State of Massachusetts, have invented certain new and useful Improvements in Thermostatic Arch Flow - Regulators, of which the following is a specification.

The present invention relates to a regulator for controlling the flow of liquid and operated by temperature changes. It is particularly adapted for regulating the flow of feed water to boilers, and is also adapted to be used to control the valves of steam traps. The principle on which the invention operates is that of an arched member which is variable in length under changes of temperature and is fixed at both ends so that changes in its length alter the position of the arched portion, which portion is employed to operate a valve. The thermostatic element operating on this principle may be embodied in a variety of forms, such, for example, as a tube or conduit adapted to contain the fluid which affects the temperature of the tube or as a rod or bar affected by external temperatures.

In the drawings I have illustrated some of the forms in which my invention may be embodied in connection with the application of one of these forms to the control of feed water to a boiler.

In the drawings, Figure 1 is a plan view with parts broken away illustrating a form of my invention adapted to regulate the flow of water to a boiler. Fig. 2 is a detail view of part of the same on a somewhat enlarged scale. Fig. 3 is a transverse sectional view of the parts shown in Fig. 2. Fig. 4 is a detail view showing the valve in a different position from that shown in Fig. 1. Fig. 5 is a view illustrating an application of the apparatus shown in the preceding figures to a steam boiler. Fig. 6 is a sectional view of a modification in which the thermostatic element is a solid bar affected by external temperatures. Fig. 7 is a detail plan partly in section of a modification in which a spring is provided to resist the heat-produced movements of the thermostatic element.

The same reference characters indicate the same parts in all the figures.

In the form of the invention shown in Figs. 1 to 5 inclusive, 10 represents a valve which is inserted in the pipe line through which feed water is conducted to the boiler. In Fig. 5, the numerals 11, 12, and 13 represent such a pipe line leading to a steam boiler 14. In this figure, 15 represents a hand valve in a by-pass of the line adapted to be used when the automatic regulator is not in operation. The valve 10 contains two seating rings 16, 17 with which coöperate respectively the valve disks 18 and 19 of a balanced valve, such disks being connected by distance rods 20, and the disk 18 being attached to a valve rod 21 by means of a nut 22 which surrounds the rod and is screwed into a boss 23 on the valve disk, wherein a flange or head 24 on the end of the rod is contained, as shown in Figs. 2 and 3.

25 represents a frame of sufficiently rigid construction in which there is mounted the thermostatic element 26. Conveniently the frame 25 is an open frame of cast iron having substantially parallel members connected together at the ends and intermediately connected by braces 27. In the opposite ends of this frame are mounted nipples 28 and 29, the former of which is internally threaded and is screwed upon one end of the thermostatic element 26, and is contained in a smooth hole in the end of the frame. It is secured by a nut 30. One end of a pipe line 31 is screwed into the nipple 28 and one end of a second pipe line 32 is screwed into the nipple 29. The end of the thermostatic member 26 adjacent to the nipple 29 registers with the pipe line 32 and is secured to the frame by a double nut 33, which is threaded both externally and internally, being screwed upon the outside of the thermostatic element and screwed into the tapped passage in the frame which receives it and the nipple 29. The thermostatic element 26 is a tube open from end to end and communicating with the pipe lines 31 and 32. It is longer than the distance between its end anchorages in the frame and is therefore given an arched form, as clearly shown in the drawing. It is flattened in cross section, having very slight width in the plane of the arch and much greater width in a perpendicular plane, whereby it has very little stiffness in the direction in which it is required to bend to increase or diminish the amount of arching. The central part of the tube, that is the part most offset from the line joining the ends of the tube, is located in the line of the valve stem 21 and is connected thereto by a coupling 34. Said coupling is formed as a chair open at one side to receive the tube and having a detachable cover 35 screwed across the open side and across the tube. Between the cover and the tube is a spring 36 to hold the bottom of the chair up against the tube. This side of the chair has lugs 37 between which is pivoted a block 38 which is screwed upon valve stem 21 and is additionally clamped thereto by a screw 39 which draws together the sides of the split threaded socket in block 37 which contains the threaded end of valve stem 21. A collar 40 having arms 41 is fixed to the valve stem and is employed to rotate the latter so as to adjust it into the block 37, and thereby position the valve disks 18 and 19 with respect to the thermostatic element. A further adjustment is given by means of the double nut 33, of which the external and internal threads have different pitches. This nut can be operated to displace the end of the tube more or less and thereby offset the crown of the arch more or less from the center line, thus additionally shifting the valve.

Referring now to Fig. 5 in which the regulator is applied to the feed line of the boiler, the frame 25 is shown in side elevation. This frame, by the way, is provided with an internally threaded boss 42 in which there is screwed a plug 43 having a head 44 which bears against the end of a bonnet 45. A nut 46 overlies the head 44 and is threaded on the bonnet and serves to clamp the coupling block 46 to the valve in such a way that the frame may be adjusted and secured at any desired angle to the axis of the valve. The coupling block 43 is bored to admit the valve stem 21 and has a stuffing box 47 to close the outer end of the passage. The pipe 31 is coupled by a flexible coupling with a pipe line 48 connected to the steam space of boiler 14, and the pipe 32 is similarly connected with a line 49 to the water space of the boiler. The thermostatic tube completes the circuit between the tubes 48 and 49.

The apparatus is mounted with the axis about which the frame and thermostatic tube are adjustable at approximately the height of the desired water level in the boiler. The frame may be adjusted at any desired angle so that the tube 26 may be completely filled and emptied by a slight change in the height of water, or may be only partly filled within a wide range of level, depending on the degree of sensitiveness and allowable fluctuation and level which it is desired to maintain.

It will be readily seen that when the tube-carrying frame is adjusted as shown in Fig. 5, a part of the tube contains water and a part contains steam. The steam line 48 is inclined toward the boiler so that the water condensed therein from the steam flows back to the boiler, and the steam which enters the thermostatic tube is practically at the same temperature as that in the boiler. The water contained in the pipe 49 and the thermostatic tube, being stagnant is very much cooler than the steam, wherefore a wide difference in temperature exists between the steam and the water which act on the tube. When the water falls and steam enters the thermostatic tube, the tube is lengthened, the spring of its arch is increased, and the valve is displaced so as to open the feed line. A contrary operation takes place when the water rises in the boiler and enters the thermostatic tube. The adjustments in the angular position of the frame and tube may be made so as to get the best effects under different conditions in regularity of feed. Where the demand on the boiler is fairly constant the regulator tube will be given a position permitting a constant flow of feed water sufficient to make up the withdrawal of steam, and there will be little or no fluctuation in the rate of supply and in the water level.

Fig. 6 illustrates a modification of the invention in which the thermostatic element is not a conduit for the governing fluid but is immersed in the fluid and acted upon externally thereby. Here the rod or bar 26ª is fixed at its ends in a chamber 50 connected with pipes 51 and 52 which may connect with the steam and water spaces of the boiler, respectively, or may connect with the steam line. The line between steam and water occurs in the chamber 50, with the effect of changing the length and degree of arching of the thermostatic rod as the water level rises and falls. In other respects this form of the invention is essentially the same as described, with such minor modifications as required to bring the valve stem adjusting device into an accessible position outside of the chamber 50, as clearly enough shown in Fig. 6.

Fig. 7 shows the application of a spring to return the thermostatic element and valve to the valve-closing position when the thermostatic element is cooled. The spring is here shown as applied to the embodiment shown in Fig. 1, but it is not limited thereto and could equally well be applied to that shown in Fig. 6. A spring 53 is contained in a casing 54 which is attached to the frame 25 and bears against the coupling 34. The abutment which takes the reaction of the spring is a plate 55, which is adjustable by means of a screw 56 threaded through the end of the spring housing, whereby the pressure of the spring may be adjusted.

The apparatus in its various forms herein described is exceedingly efficient as applied to boiler feeds, and accomplishes the desired end of maintaining the water level at a sufficiently constant point with a sufficiently uniform flow of the feed water and with the use of apparatus which is exceedingly simple in construction, but is not liable to get out of order, and is much more powerful and positive than the usual float regulator. The essential principles of the invention are also applicable to the control of a valve for other purposes.

It will be appreciated from the foregoing description that the term "tube", as used therein and in the following claims is not restricted as to shape in cross section otherwise than as specifically stated, but is used with the broad meaning of a conduit. So also the term "flattened" is not intended as a restriction to a form in which the faces of the tube are straight in the transverse direction, but is intended to include any cross section of which one dimension is longer than the other; in other words, any form which secures the result particularly described.

What I claim and desire to secure by Letters Patent is:

1. A valve-controlling apparatus comprising an elongated thermostatic element, means for holding the ends of said element rigidly, the intermediate portion of the element being displaced from a straight line joining said ends and being adapted to move in consequence of temperature-induced elongations and contractions in directions transverse to its length, the element being constructed with its transverse dimension in the direction of intended movement less than the transverse dimension in any other direction, whereby it is enabled to resist deflecting movement in any except the designed directions, and valve-operating means connected to the displaced portion of said element.

2. A valve-controlling apparatus comprising an elongated thermostatic element permanently set in arched form, means for holding the ends of said element fixed with respect to one another, whereby elongations and contractions due to temperature changes in said element cause the intermediate portion to be deflected laterally, said element being of non-circular cross section with its shortest transverse dimension in the plane of the arch, whereby deflection in any other direction than in such plane is prevented, and a valve-operating connection attached to the deflected part of the element.

3. A thermostatic valve-controlling apparatus comprising a permanently arched tube, a frame in which the ends of said tubes are fixed at a distance apart less than the total length of the tube, said tube being flattened in cross section and having its longer transverse dimension perpendicular to the plane in which it is arched, whereby it is stiffened against deflection in any other plane than that of the arch, and valve-operating means connected to the tube at the crown of the arch.

4. A thermostatic valve-operating mechanism comprising in combination with a valve, a stem projecting from said valve, a thermostatic element connected to said stem and extending approximately perpendicular thereto and being arched or offset in the common plane of the stem and the element, and means for mounting the ends of said element at a fixed distance apart, whereby elongations and contractions of the element due to temperature changes cause the part thereof to which the valve stem is connected to be deflected in the direction of said valve stem, the thermostatic element having its transverse dimension in the direction of the valve stem less than the transverse dimension perpendicular to said stem.

5. The combination of a valve casing, a valve in said casing having a stem protruding through the casing, a holder mounted on the casing and having provisions for adjustment angularly about its point of connection, a nearly straight thermostatic element fixed at its ends to said holder and of slightly greater length than the distance between its ends, whereby it forms a flat arch, and connections between the central part of said element and the valve stem arranged to transmit the movements of such part to the valve in the directions of opening and closing movements of the latter.

6. A thermostatic boiler feed regulator comprising a tube bent into the form of a flat arch, a holder to which the ends of said tube are rigidly fixed, pipe lines connecting the opposite ends of the tube with the steam space and the water space, respectively, of a boiler, said tube being mounted at the height of the desired water level in the boiler, a valve in the feed line of the boiler, and connections for translating the spring of the central part of said tube into opening and closing movements of said valve.

7. A thermostatic boiler feed regulator comprising a tube bent into the form of a flat arch, a holder to which the ends of said tube are rigidly fixed, pipe lines connecting the opposite ends of the tube with the steam space and the water space, respectively, of a boiler, said tube being mounted at the height of the desired water level in the boiler and the holder being angularly adjustable about a horizontal axis transverse to the tube, whereby the latter may be set at an angle to the horizontal, a valve in the feed line of the boiler, and connections for translating the spring of the central part of said tube into opening and closing movements of said valve.

8. A thermostatic valve controller consisting of an arched thermostatic tube fixed at both ends and adapted to spring in the middle with temperature changes, the tube being flattened and having its shorter transverse dimension in the plane of the arch, means for shifting the anchorage of one of its ends toward and away from the other to vary the amount of the spring, and connections from the middle of said element to a valve.

9. A thermostat comprising an arched element adapted to be elongated and contracted by temperature changes and having its central portion slightly offset from a straight line joining its ends, said element being flattened with its shorter dimension in the direction of such offset, means firmly securing the ends of said element at a fixed distance apart, whereby the offset portion is caused to be deflected as the element is elongated and contracted, and means for transmitting motion from the offset part of the element to the member which is operated thereby.

10. A thermostat comprising a frame, a flattened tubular thermostatic element having its opposite ends fixed in said frame, and the frame having passages adapted to permit flow of heat-carrying fluid into one end and out of the opposite end of said tube, said tube being longer than the distance between its ends and being sprung between its ends to one side of such straight line, the amount by which the tube is thus sprung being a small proportion of the length of the tube, and means for transmitting motion from the offset part of the tube to the thing operated thereby.

11. In a boiler feed regulator, a valve casing, a valve arranged and movable horizontally therein having a stem projecting in the line of its movement, a frame mounted upon said valve casing in a manner permitting angular adjustment about said stem, a tube fixed at its ends in said frame and connected at its central part with said stem, said tube being longer than the distance between its ends and being arched in a plane including the valve stem, and conduits communicating with the opposite ends of said tube for conducting steam and water thereinto.

12. The combination with a boiler, of a feed water pipe leading to said boiler, a valve in said feed water pipe movable horizontally and having a stem projecting in the direction of its movement, a frame mounted on the casing of said valve in a manner permitting angular adjustment about said stem as a center, a thermostatic tube fixed at its ends in said frame and connected at its central portion with the valve stem, the tube being arched with its central part offset, from a straight line joining its ends, in the direction in which said valve stem extends, and pipes connecting opposite ends of said tube with the steam space and water space of a boiler, respectively, the valve being located approximately at the height of the water level in the boiler.

In testimony whereof I have affixed my signature in presence of two witnesses.

FRANK H. HOPKINS.

Witnesses:
 ARTHUR H. BROWN,
 J. MURPHY.